United States Patent
Lucrecio et al.

(10) Patent No.: US 9,941,965 B2
(45) Date of Patent: Apr. 10, 2018

(54) LASER AND OPTICAL CHARGING AND COMMUNICATIONS DEVICE AND METHOD OF USE

(71) Applicant: Flextronics AP, LLC, San Jose, CA (US)

(72) Inventors: Armando J. Lucrecio, Fremont, CA (US); Jiayin Ma, Palo Alto, CA (US); Leonard Richiuso, Murphy, TX (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 14/937,553

(22) Filed: Nov. 10, 2015

(65) Prior Publication Data
US 2017/0070292 A1    Mar. 9, 2017

Related U.S. Application Data

(60) Provisional application No. 62/214,362, filed on Sep. 4, 2015.

(51) Int. Cl.
| | |
|---|---|
| H04B 10/80 | (2013.01) |
| H04B 10/27 | (2013.01) |
| F21V 8/00 | (2006.01) |
| H02J 7/00 | (2006.01) |
| H02J 7/35 | (2006.01) |
| H04B 10/50 | (2013.01) |
| G02B 6/42 | (2006.01) |

(52) U.S. Cl.
CPC .......... *H04B 10/27* (2013.01); *G02B 6/0006* (2013.01); *G02B 6/0008* (2013.01); *G02B 6/4204* (2013.01); *G02B 6/4298* (2013.01); *H02J 7/0052* (2013.01); *H02J 7/355* (2013.01); *H04B 10/502* (2013.01); *H04B 10/503* (2013.01); *H04B 10/806* (2013.01); *H04B 10/807* (2013.01); *G02B 6/428* (2013.01); *H02J 2007/0062* (2013.01)

(58) Field of Classification Search
CPC ...................................... H04B 10/806–10/808
USPC ........................................................ 398/171
See application file for complete search history.

(56) References Cited

U.S. PATENT DOCUMENTS

| | | | | |
|---|---|---|---|---|
| 5,528,409 | A * | 6/1996 | Cucci ................... | H04B 10/807 398/113 |
| 2004/0141744 | A1* | 7/2004 | Krill ................... | H04B 10/807 398/58 |
| 2004/0266367 | A1* | 12/2004 | Tuominen ............ | H04B 10/807 455/91 |
| 2005/0226625 | A1* | 10/2005 | Wake ............... | H04B 10/25753 398/115 |
| 2008/0235418 | A1* | 9/2008 | Werthen ............... | H04B 10/807 710/106 |
| 2009/0016715 | A1* | 1/2009 | Furey ................... | H04B 10/807 398/38 |
| 2009/0103925 | A1* | 4/2009 | Alpert .................. | H04B 10/807 398/130 |

(Continued)

*Primary Examiner* — Li Liu
(74) *Attorney, Agent, or Firm* — Sheridan Ross P.C.

(57) ABSTRACT

Techniques for charging and optical communication with electronic devices are provided. Specifically, systems and methods to provide charging through laser or optical means and to provide optical communications are presented. Even more specifically, in one embodiment, the systems and methods comprise standard USB interfaces, USB protocols and USB connectors.

20 Claims, 4 Drawing Sheets

(56) References Cited

U.S. PATENT DOCUMENTS

| | | | |
|---|---|---|---|
| 2010/0320362 A1* | 12/2010 | Alpert | H01S 3/083 250/200 |
| 2013/0301984 A1* | 11/2013 | Chan | H02J 50/30 385/24 |
| 2013/0314028 A1 | 11/2013 | Tseng | |
| 2014/0086592 A1* | 3/2014 | Nakahara | H02J 5/005 398/130 |
| 2014/0132201 A1 | 5/2014 | Tsang | |
| 2014/0270789 A1* | 9/2014 | Coffey | H04B 10/807 398/116 |
| 2016/0094298 A1* | 3/2016 | Isfeldt | H04B 10/80 398/104 |
| 2016/0127042 A1* | 5/2016 | Farr | H04B 10/2581 398/104 |

\* cited by examiner

LASER AND OPTICAL CHARGING AND COMMUNICATIONS DEVICE AND METHOD OF USE

CROSS REFERENCE TO RELATED APPLICATIONS

The present application claims the benefits of and priority, under 35 U.S.C. § 119(e), to U.S. Provisional Application Ser. No. 62/214,362, filed on Sep. 4, 2015, entitled "Laser Charging and Optical Bi-Directional Communications Using Standard USB Terminals," the entire disclosure of which is hereby incorporated herein by reference, in its entirety, for all that it teaches and for all purposes.

This application is also related to U.S. Provisional Application Ser. No. 62/210,303, filed on Aug. 26, 2015, entitled "Diffusive Optical Fiber as Ambient Light Sensors, Optical Signal Transceiver, Proximity Sensor," 62/212,844, filed on Sep. 1, 2015, entitled "Diffusive Optical Fiber as Ambient Light Sensors, Optical Signal Transceiver, Proximity Sensor," 62/216,861, filed on Sep. 10, 2015, entitled "Diffusive Optical Fiber as Ambient Light Sensors, Optical Signal Transceiver, Proximity Sensor," 62/193,037, filed on Jul. 15, 2015, entitled "Remote Device Charging," 62/195,726, filed on Jul. 22, 2015, entitled "Remote Device Charging," and 62/197,321, filed on Jul. 27, 2015, entitled "Device Communication, Charging and User Interaction." The entire disclosures of the applications listed above are hereby incorporated by reference, in their entirety, for all that they teach and for all purposes.

FIELD

The disclosure relates generally to charging and optical communications with electronic devices, such as systems and methods to provide charging through laser or optical means and to provide optical communications.

BACKGROUND

Existing devices and methods to charge electronic devices are typically bulky, of relatively slow speed or bandwidth, and incompatible with standard protocols or hardware interfaces. Therefore, there is a need for a relatively high speed, high bandwidth device and method of use that is compatible with existing USB, micro USB, mini USB standards and hardware interfaces. This disclosure solves those needs.

By way of providing additional background, context, and to further satisfy the written description requirements of 35 U.S.C. § 112, the following references are incorporated by reference in their entireties: U.S. Pat. Pub. Nos. 2013/0314028 to Tseng and 2014/0132201 to Tsang.

SUMMARY

The disclosure provides a system and method of use to provide charging and optical communication with electronic devices. Specifically, systems and methods to provide charging through laser or optical means and to provide optical communications are presented. Even more specifically, in one embodiment, the systems and methods comprise standard USB interfaces, USB protocols and USB connectors.

In one embodiment, a charging and communications device is disclosed, the device comprising: a transmitter configured to receive power from an external source, the transmitter comprising a power module, a power charging laser, and a diffuser film; and a receiver configured to interconnect with the transmitter, the receiver comprising PV cells; wherein the power module controls the laser; wherein the power charging laser emits a laser light diffused by the diffuser film and received by the PV cells; wherein the receiver outputs a device power output.

In another embodiment, a method of charging is disclosed, the method comprising: providing a charging device comprising: i) a transmitter configured to receive power from an external source, the transmitter comprising a power module, a laser, a diffuser film and a photon detector, and ii) a receiver configured to interconnect with the transmitter, the receiver comprising PV cells and a laser/LED diode, wherein the photon detector is configured to receive a signal from the laser/LED diode; engaging the charging device with an external power source; providing power to the charging device from the external power source; activating the laser upon receipt of the laser/LED diode signal, wherein the laser emits a laser light diffused by the diffuser film and received by the PV cells; and outputting a device power output from the receiver.

In yet another embodiment, a charging and communications system is disclosed, the system comprising: a transmitter configured to receive power from an external source, the transmitter comprising a power module, a power charging laser, and a diffuser film; and a receiver configured to interconnect with the transmitter, the receiver comprising PV cells; wherein the power module controls the laser; wherein the power charging laser emits a laser light diffused by the diffuser film and received by the PV cells; wherein the receiver outputs a device power output; wherein the receiver further comprises a laser/LED diode and the transmitter further comprises a photon detector configured to receive a signal from the laser/LED diode, wherein the receiver only outputs a device power when the photon detector receives the laser/LED diode signal.

BRIEF DESCRIPTION OF THE DRAWINGS

For a more complete understanding of the present disclosure and its advantages, reference is now made to the following description taken in conjunction with the accompanying drawings, in which like reference numerals represent like parts.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Number | Component |
|---|---|
| 100 | Device |
| 200 | Transmitter |
| 210 | Transmitter First End |

-continued

| Number | Component |
|---|---|
| 212 | Transmitter USB Interface |
| 220 | Transmitter Second End |
| 230 | Laser |
| 240 | Power Management Module |
| 250 | Modulator |
| 260 | Diffuser Film |
| 270 | Photon Detector |
| 282 | Power One |
| 284 | Optical Communication One |
| 300 | Receiver |
| 310 | Receiver First End |
| 312 | Receiver First PV Cells |
| 320 | Receiver Second End |
| 370 | Laser/LED Diode |
| 372 | Laser/LED Diode Signal |
| 382 | Power Two |
| 384 | Optical Communication Two |
| 400 | External Device |
| 482 | External Device Power |
| 484 | External Device/Device Power Communications |
| 500 | Adapter |
| 510 | Adapter First End |
| 512 | Adapter PV Cells |
| 520 | Adapter Second End |
| 522 | Adapter USB Interface |
| 582 | Power Three |
| 584 | Optical Communication Three |

DETAILED DESCRIPTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "PV" means photovoltaic and generally refers to a means or method of converting light or solar energy into electricity.

The term "PV array" means an assembly of PV cells or modules.

The term "USB" means universal serial bus and refers to hardware, such as cables and connectors, and communications protocols used in a bus for connection, communication and/or power transfer.

The term "USB protocol" means a USB communication protocol.

The term "USB connector" or "USB hardware connector" refers to a physical USB connector.

The term "wireless USB" refers to wireless communication using USB protocols.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Figure 1:
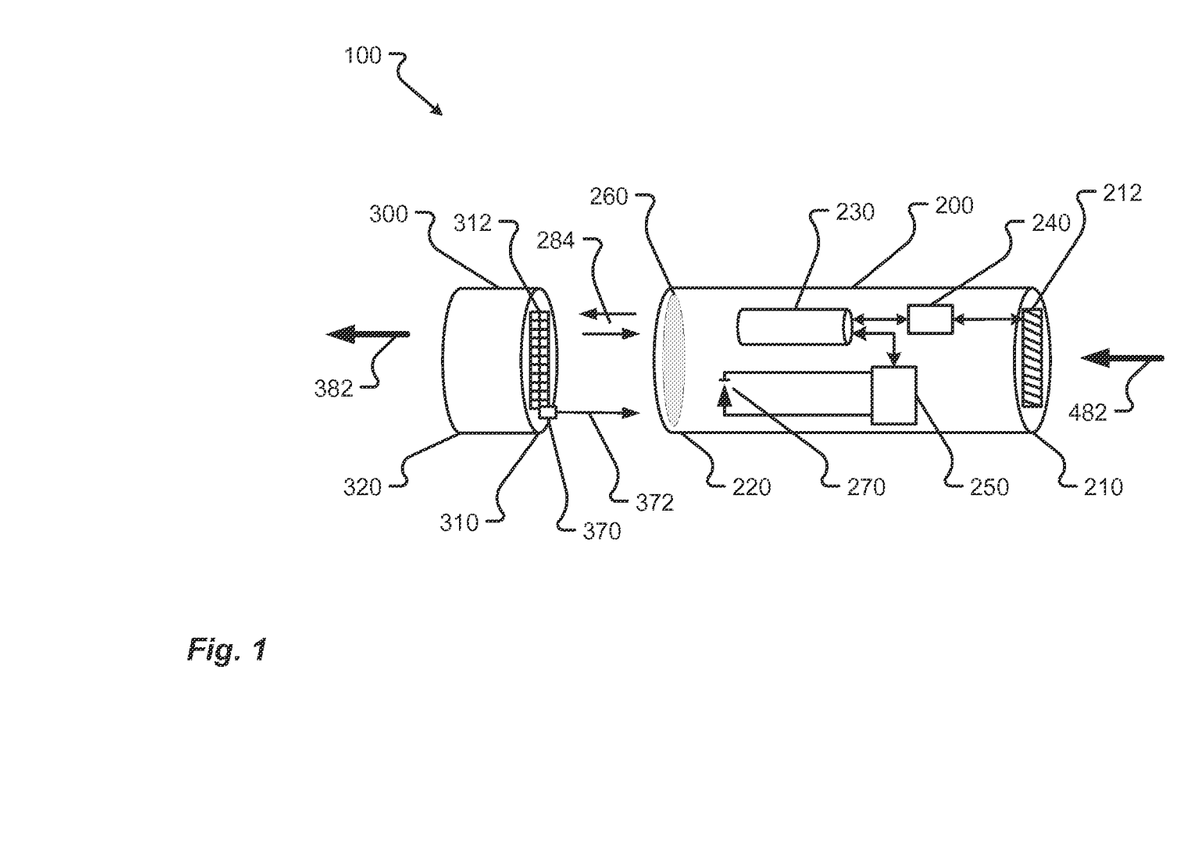
FIG. 1 provides a representation of one embodiment of the charging and optical communication system.
Figure 2A:
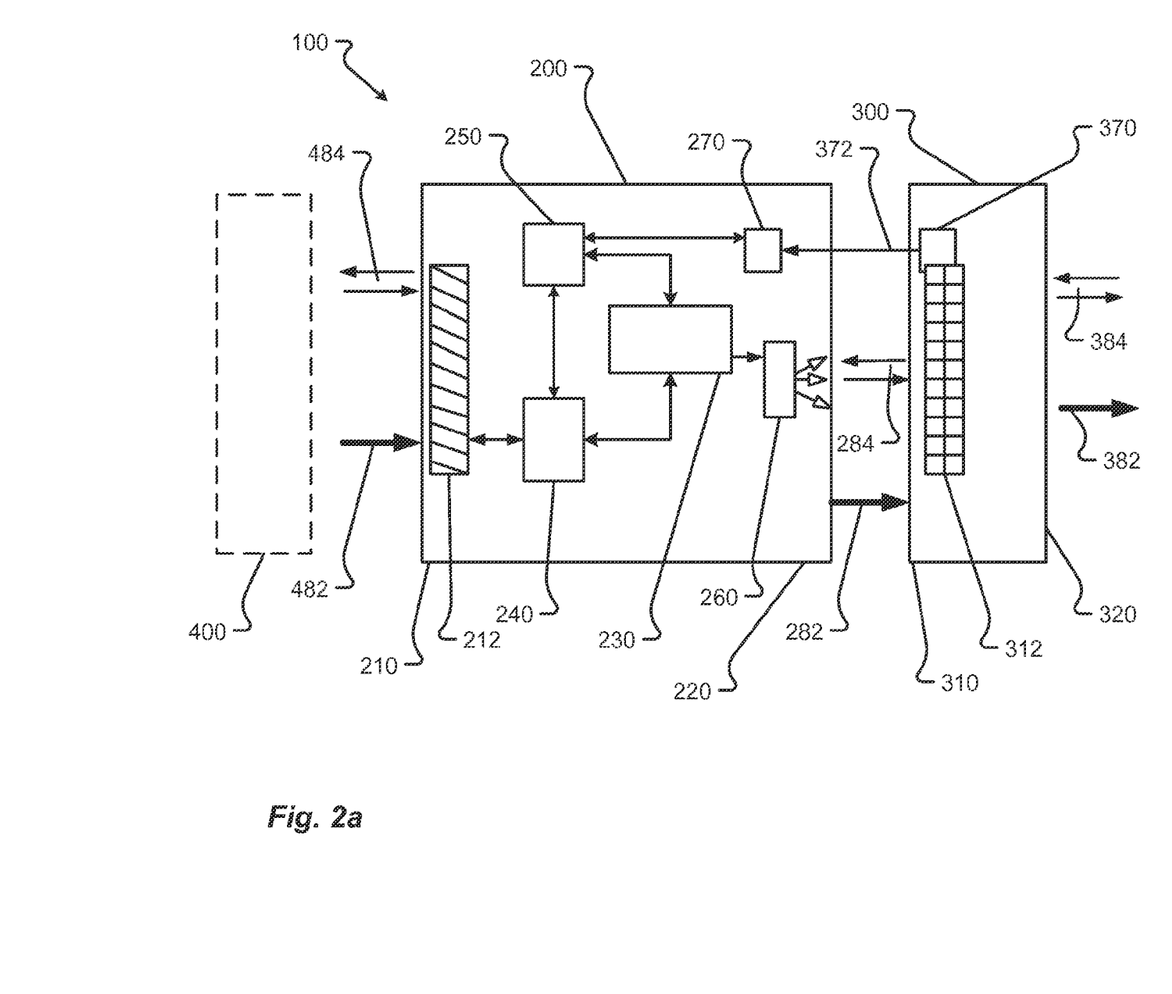
FIG. 2a provides a block diagram of the embodiment of the charging and optical communication system of FIG. 1.
Figure 2B:
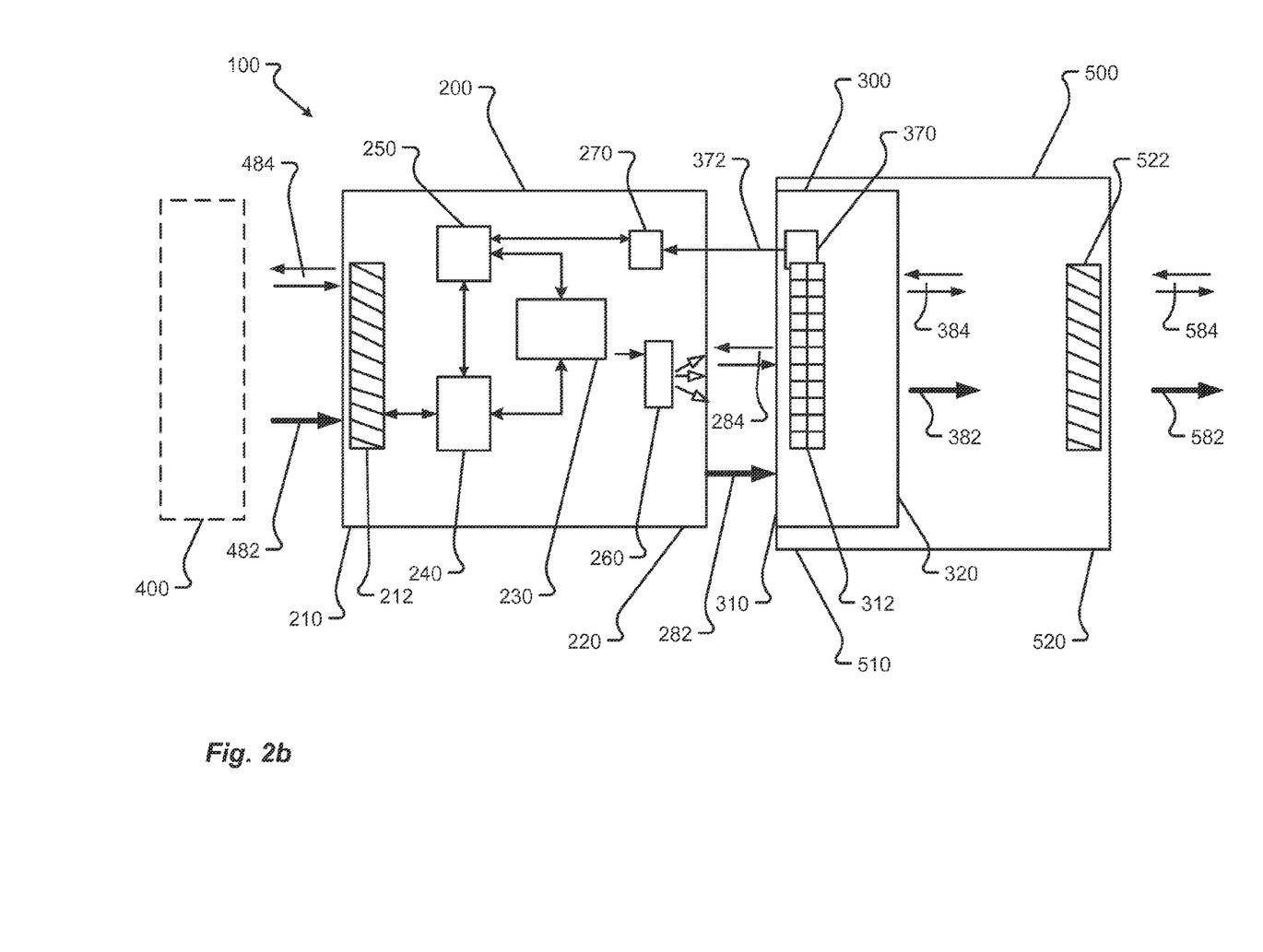
FIG. 2b provides a block diagram of another embodiment of the charging and optical communication system.
Figure 3:
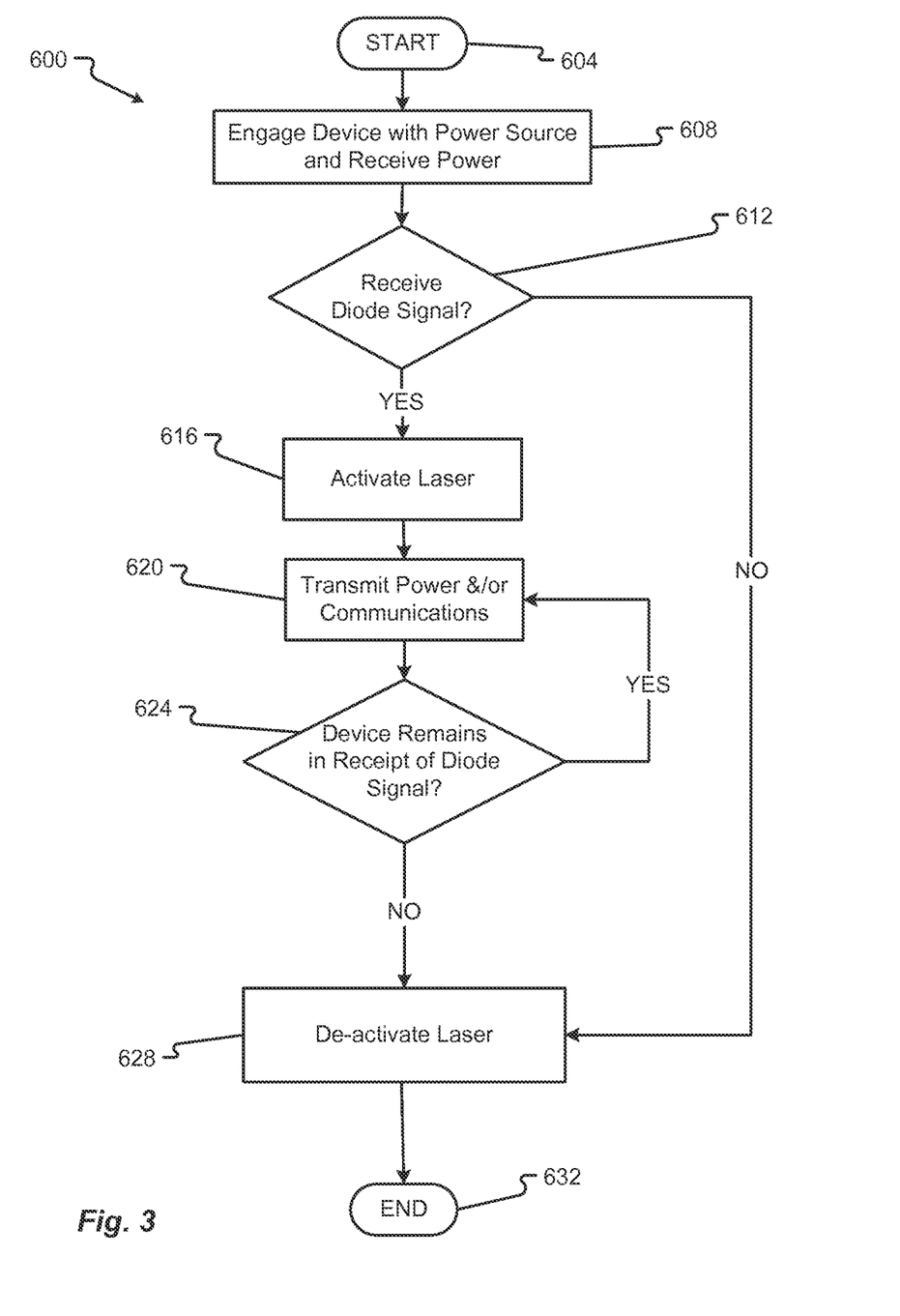
FIG. 3 provides a flow chart of a method of use of the charging and optical communication system of FIG. 1.

With attention to FIGS. 1-3, embodiments of the charging and optical communications device 100 are depicted.

Generally, the device 100 comprises a transmitter 200 and receiver 300. The transmitter 200 comprises transmitter first end 210 and transmitter second end 220, laser 230, power management 240, modulator 250, diffuser film 260, and photon detector 270. The transmitter first end 210 comprises transmitter USB interface 212. The transmitter 200 receives external device power 482 and may communicate with one or more external devices by way of external device/device power communications 484. The transmitter 200 provides optical communication one 284 with receiver 300, and receives laser/LED diode signal 372 from receiver 300.

The receiver 300 comprises receiver first end 310 and receiver second end 320, receiver first PV cells 312 and laser/LED diode 370 which emits laser/LED diode signal 372. Receiver 300 emits power two 382 and optical communication two 384. Receiver first PV cells 312 and laser/LED diode 370 are disposed at receiver first end 310. Receiver 300 receives optical communications one 284 from transmitter 200 and receives power one 282 from transmitter 200. Receiver laser/LED diode 370 emits laser/LED diode signal 372 directed toward transmitter photon detector 270.

The device 100 may further comprise adapter 500. Adapter 500 comprises adapter first end 510 and adapter second end 520. Generally, adapter 500 is fitted with receiver 300 at adapter first end 510, and further comprises adapter USB interface 522. Adapter 500, internally, receives power two 382 and optical communication two 384 from receiver 300 portion and, via adapter USB interface 522, converts one or both of power two 382 and optical communication two 384 to USB protocol so as to provide one or more of power two 382 and optical communication two 384 via a USB hardware interface.

The transmitter 200 receives electrical power, i.e. external device power 482, from one or more external sources, such as a standard wall outlet, a personal computer, or a laptop computer, and may be a wireless connection. The external device power 482 is received at transmitter USB interface 210. Transmitter USB interface 210 is a USB hardware interface and operates with USB protocol. The transmitter power management module 240 receives electrical power from transmitter USB interface 210 and delivers electrical power to laser 230 and to modulator 250. Furthermore, the transmitter power management module 240 controls the laser 230 via one or more driver circuits and/or controllers. The laser 230 transforms electrical energy, as received from power management module 240, into light energy. Laser 230 emits light to diffuser film 260, which diffuses or spreads received light toward receiver 200, so as to be received by receiver first PV cells 312. In one embodiment, one or more wave guides are involved to receive and transmit the laser light.

Modulator 250, as powered by power management module 240, modulates bi-directional optical communication functions, given inputs from an external source such as a laptop, as output to the laser 230 so as to enable optical communications via laser 230 output. Modulator 250 may modulate the laser light in any manner known to those skilled in the art, to include as amplitude modulation, phase modulation and/or polarization modulation. In one embodiment, wherein the device 100 is not configured to perform optical communications, the modulator module 250 is not a component of device 100.

Photon detector 270 is disposed at transmitter second end 220 and is positioned to receive laser/LED diode signal 372 as emitted from receiver laser/LED diode 370. Photon detector 270 is in communication with power management module 240 and provides a signal to power management module 240 indicating receipt or non-receipt of laser/LED diode signal 372. In one embodiment, the power management module 240 only operates the laser 230 (that is, sends a signal to the laser 230 to activate and emit laser light) when the power management module 240 is in receipt of a signal from the photon detector 270 that a laser/LED diode signal 372 has been affirmatively received.

Receiver first PV cells 312 receives laser light emitted from laser 230 by way of diffuser film 260. In one embodiment, the receiver first PV cells 312 are disposed at the receiver first end 310 wherein the receiver first end 310 is configured as a male end so as to engage the transmitter second 220 female end. Receiver laser/LED diode 370 emits laser/LED diode signal 372 directed toward transmitter photon detector 270. The laser/LED diode signal 372 functions to establish communication between the transmitter 200 and the receiver 300, and may also function as a safety device as discussed above (that is, serving to activate or not activate the laser 230). In one embodiment, the receiver laser/LED diode 370 is disposed adjacent or next to or to the side of the receiver first PV cells 312. In one embodiment, the receiver laser/LED diode 370 is disposed parallel to an outer edge surface of the receiver 300 at the receiver first end 310.

Receiver first PV cells 312 convert received laser light into electrical power as output as power two 382. The electrical power output by receiver 300 is provided at receiver second end 320 and may comprise any format as known to those skilled in the art, to include 120 Volt at 60 Hz and 230 Volt at 50 Hz. In one embodiment the electrical power output by receiver 300 is of USB protocol.

In one embodiment, one or both of transmitter USB interface 212 and adapter USB interface 522 comprise any USB hardware interface known to those skilled in the art, to include micro-USB, mini-USB and standard USB hardware interfaces.

In one embodiment, the device 100 is of approximate physical dimensions of USB devices, such as USB memory storage devices, known to those skilled in the art.

In one embodiment, one or more interconnections between elements of the device 100 comprise wireless USB.

In another embodiment, the device 100 solely performs optical (i.e. laser-based) charging, wherein power provided by a first external device (e.g. a laptop computer, personal computer, smartphone) is provided to a second external device (e.g. a laptop computer, personal computer, smartphone).

In one embodiment, the device 100 solely performs optical (i.e. laser-based) communication between a first external device (e.g. a laptop computer, personal computer, smartphone) and a second external device (e.g. a laptop computer, personal computer, smartphone).

In one embodiment, the device 100 comprises its own power supply, such as a battery such as a lithium battery, so as to power the laser and provide any set of functions disclosed above, such as charging and optical communication.

In one embodiment, the device 100 may operate in any of three selectable modes: power charging only, optical communications only, and both power charging and optical communications.

With reference to FIGS. 1 and 2, FIG. 3 provides a flow chart illustrating an exemplary method of use of the charging and optical communication system 100. Generally, the method 600 starts at step 604 and ends at step 632.

At step 608 of the method 600, the device 100 is engaged with external device 400 by way of receiver first end 210.

The device 100 receives external device power 482 and may, in some embodiments, communicate with external device 400 via external device/device power communications 484. External device/device power communications 484 may comprise on/off receive or no receive signals and power modulation signals, the later in some embodiments controlled by power management module 240.

At step 612, a query is made as to whether the device 100 has received diode signal from receiver. More specifically, photon detector 270 of transmitter 200, in communication with power management module 240, provides a signal to power management module 240 indicating receipt or non-receipt of laser/LED diode signal 372 from receiver 300. If the result of the query is Yes or Positive, such a signal has been received and the method 600 proceeds to step 616. If the result of the query is No or Negative, the signal has not been received and the method 600 proceeds to step 628.

At step 616, the laser 230 is activated by power management module 240. The method 600 then proceeds to step 620.

At step 620, the laser 230 transmits power and/or provides optically-based bi-directional communications, as selected by the user or as the device 100 is configured. The method 600 then proceeds to step 624.

At step 624, a query is made as to whether the device 100 continues to receive diode signal from receiver. More specifically, photon detector 270 of transmitter 200, in communication with power management module 240, provides a signal to power management module 240 indicating receipt or non-receipt of laser/LED diode signal 372 from receiver 300. If the result of the query is Yes or Positive, such a signal continues to be received and the method 600 proceeds to step 620. If the result of the query is No or Negative, the signal has stopped being received and the method 600 proceeds to step 628.

At step 628 of method 600, the laser 230 is de-activated by power management module 240. The method 600 then proceeds to step 632 wherein the method 600 ends.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for laser and optical charging and communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. An optical charging and communications device comprising:
    a transmitter having a first end and a second end, the transmitter configured to receive power from an external source, the transmitter comprising a power module, a power charging laser, and a diffuser film, wherein the transmitter includes a detector disposed at the second end; and
    a receiver having a first end and a second end, the receiver including an emitter disposed at the first end of the receiver, wherein the emitter is configured to operatively interconnect with the detector defining a connected state between the transmitter and receiver, the receiver comprising an array of two or more PV cells;
    wherein the power module controls the laser;
    wherein the power charging laser emits a laser light, wherein the laser light is diffused by the diffuser film, exits the diffuser film, and is sent over the air to the array of two or more PV cells, the array of two or more PV cells being disposed opposite the power charging laser and diffuser film in the connected state between the transmitter and receiver; and
    wherein the receiver outputs a device power output.

2. The device of claim 1, wherein the power module receives power from an external source.

3. The device of claim 2, wherein the received power is received via a USB connector, and wherein the USB connector is disposed at the first end of the transmitter.

4. The device of claim 1, wherein the emitter further comprises a laser/LED diode and the detector further comprises a photon detector disposed opposite the laser/LED diode in the connected state, the photon detector configured to receive a connection signal from the laser/LED diode.

5. The device of claim 4, wherein the power charging laser of the transmitter emits the laser light only when the photon detector receives the laser/LED diode connection signal and the device is in the connected state.

6. The device of claim 1, further comprising a modulator configured to manage optical communications between the transmitter and the receiver.

7. The device of claim 6, wherein the modulator modulates optical communications output by the laser.

8. The device of claim 7, wherein the device power output is of USB protocol.

9. The device of claim 8, further comprising:
an adapter configured to receive the device power output from the receiver and output the device power output via a USB connector disposed at an end of the adapter.

10. A method of optical charging comprising:
providing an optical charging device comprising: i) a transmitter having a first end and a second end, the transmitter configured to receive power from an external source, the transmitter comprising a power module, a laser, a diffuser film and a photon detector, wherein the transmitter includes a detector disposed at the second end, and ii) a receiver having a first end and a second end, the receiver including an emitter disposed at the first end of the receiver, and wherein the emitter is configured to operatively interconnect with the detector defining a connected state between the transmitter and receiver, the receiver comprising an array of two or more PV cells and a laser/LED diode, the array of two or more PV cells being disposed opposite the laser and diffuser film in the connected state between the transmitter and receiver, wherein the photon detector is configured to receive a connection signal from the laser/LED diode when the device is in the connected state;
engaging the optical charging device with an external power source;
providing power to the charging device from the external power source;
interconnecting the transmitter and receiver via mating the detector with the emitter;
activating the laser only upon receipt of the laser/LED diode connection signal, wherein the laser emits a laser light;
the laser light diffusing by the diffuser film;
the diffused laser light exiting the diffuser film;
sending the diffused laser light over the air to the array of two or more PV cells; and
outputting a device power output from the receiver.

11. The method of claim 10, wherein the received power is received via a USB connector, and wherein the USB connector is disposed at the first end of the transmitter.

12. The method of claim 10, wherein the charging device further comprises a modulator configured to manage optical communications between the transmitter and the receiver.

13. The method of claim 12, wherein the modulator modulates optical communications output by the laser.

14. The method of claim 13, wherein the charging device power output is of USB protocol.

15. The method of claim 14, wherein the charging device further comprises an adapter configured to receive the device power output from the receiver and output the device power output via a USB connector disposed at an end of the adapter.

16. An optical charging and communications system comprising:
a transmitter having a first end and a second end, the transmitter configured to receive power from an external source, the transmitter comprising a power module, a power charging laser, and a diffuser film, wherein the transmitter includes a detector disposed at the second end; and
a receiver having a first end and a second end, the receiver including an emitter disposed at the first end of the receiver, and wherein the emitter is configured to operatively interconnect with the detector defining a connected state between the transmitter and receiver, the receiver comprising an array of two or more PV cells;
wherein the power module controls the laser;
wherein the power charging laser emits a laser light, wherein the laser light is diffused by the diffuser film, exits the diffuser film, and is sent over the air to the array of two or more PV cells, the array of two or more PV cells being disposed opposite the power charging laser and diffuser film in the connected state between the transmitter and receiver;
wherein the receiver outputs a device power output; and
wherein the receiver further comprises a laser/LED diode and the transmitter further comprises a photon detector configured to receive a connection signal from the laser/LED diode indicating the transmitter is operatively connected with the receiver, wherein the power charging laser of the transmitter emits the laser light only when the photon detector receives the laser/LED diode connection signal and the transmitter is operatively connected with the receiver.

17. The system of claim 16, wherein the received power is received via a USB connector, and wherein the USB connector is disposed at the first end of the transmitter.

18. The system of claim 16, wherein the charging device further comprises a modulator configured to manage optical communications between the transmitter and the receiver.

19. The system of claim 18, wherein the modulator modulates optical communications output by the laser.

20. The system of claim 19, wherein the charging device power output is of USB protocol, and wherein the charging device further comprises an adapter configured to receive the device power output from the receiver and output the device power output via a USB connector disposed at an end of the adapter.

* * * * *